United States Patent
Haessig, Jr. et al.

(10) Patent No.: US 10,230,467 B1
(45) Date of Patent: Mar. 12, 2019

(54) APPARATUS AND METHOD FOR RAPID IDENTIFICATION OF LASER COMMUNICATION BEACONS

(71) Applicant: BAE Systems Information and Electronic Systems Integration Inc., Nashua, NH (US)

(72) Inventors: David A Haessig, Jr., Towaco, NJ (US); Dennis P Bowler, Sudbury, MA (US); Robert T Carlson, Bedford, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 16/000,991

(22) Filed: Jun. 6, 2018

(51) Int. Cl.
*H04B 10/118* (2013.01)
*H04B 10/67* (2013.01)
*H04B 10/112* (2013.01)

(52) U.S. Cl.
CPC ....... *H04B 10/118* (2013.01); *H04B 10/1121* (2013.01); *H04B 10/67* (2013.01)

(58) Field of Classification Search
CPC ...... H04B 10/11–10/116; H04B 10/61–10/677
See application file for complete search history.

(56) References Cited

U.S. PATENT DOCUMENTS

| | | | | |
|---|---|---|---|---|
| 2004/0258415 | A1* | 12/2004 | Boone | H04B 10/1125 398/125 |
| 2015/0188628 | A1* | 7/2015 | Chalfant, III | G02B 13/22 398/131 |
| 2016/0204866 | A1* | 7/2016 | Boroson | H04B 10/1121 398/97 |

* cited by examiner

*Primary Examiner* — Casey Kretzer
(74) *Attorney, Agent, or Firm* — Maine Cernota & Rardin (57) ABSTRACT

An apparatus and method for tracking a laser communication signal of interest incident on a focal plane array (FPA) identifies a plurality of "hotspots" in a scene of interest, and aligns a hotspot that is a signal of interest (SOI) or beacon component thereof with the FPA. Hotspot centroids can be estimated within a fraction of an FPA pixel by considering squares of four pixels and comparing their signal amplitudes. A multi-spot calculation is used to improve the position estimates of all of the hotspots by applying a Kalman filter to the hotspot position data and assuming that the relative hotspots positions are fixed. The calculation is periodically repeated to enable tracking of the SOI. Amplitude variability of the hotspots is accommodated by weighting the hotspot contributions according to their intensities. In embodiments, estimation error of the SOI centroid is less than a smallest dimension of the FPA pixels.

16 Claims, 9 Drawing Sheets

APPARATUS AND METHOD FOR RAPID IDENTIFICATION OF LASER COMMUNICATION BEACONS

FIELD OF THE DISCLOSURE

The invention relates to wireless telecommunications, and more particularly, to wireless laser communications.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless" as used herein excludes fiber optic communication as well as communication over copper wires.

Traditional communication by wireless radio frequencies suffers from several shortcomings, many of which arise from the wide geographic dispersion of typical radio emissions. Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. And so-called "multi-user" detection can be employed to further distinguish signals transmitted on overlapping frequencies.

The geographic range of wireless signals can be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Laser communication offers an attractive wireless alternative to radio communication, especially when point-to-point communication is required, because the non-dispersed, focused character of laser communication intrinsically avoids most of the problems that are associated with radio communication. In particular, there is no need to assign frequency bands to laser communication users, because interference between laser signal beams is avoided so long as two beams are not directed to the same recipient. Laser signals experience very little attenuation as a function of distance, because the signal energy remains tightly focused in a beam. And communication security is intrinsically high, because interception of and interference with laser communications requires direct interception of a laser communication beam, and/or focusing jamming beams directly at an intended signal receiver.

One important application that can benefit significantly from laser communication is satellite communications, where line-of-sight access is generally available, and where the communication distances are very great. Laser communication can provide communication data rates for satellites that are much higher than radio data rates, with unmatched anti-jam characteristics and an inherently low risk of communications intercept. Laser communication also eliminates the need for frequency planning and authorization, and circumvents the highly congested RF spectrum bandwidth constraints that limit the practical data rates available to users of RF links.

Figure 1:
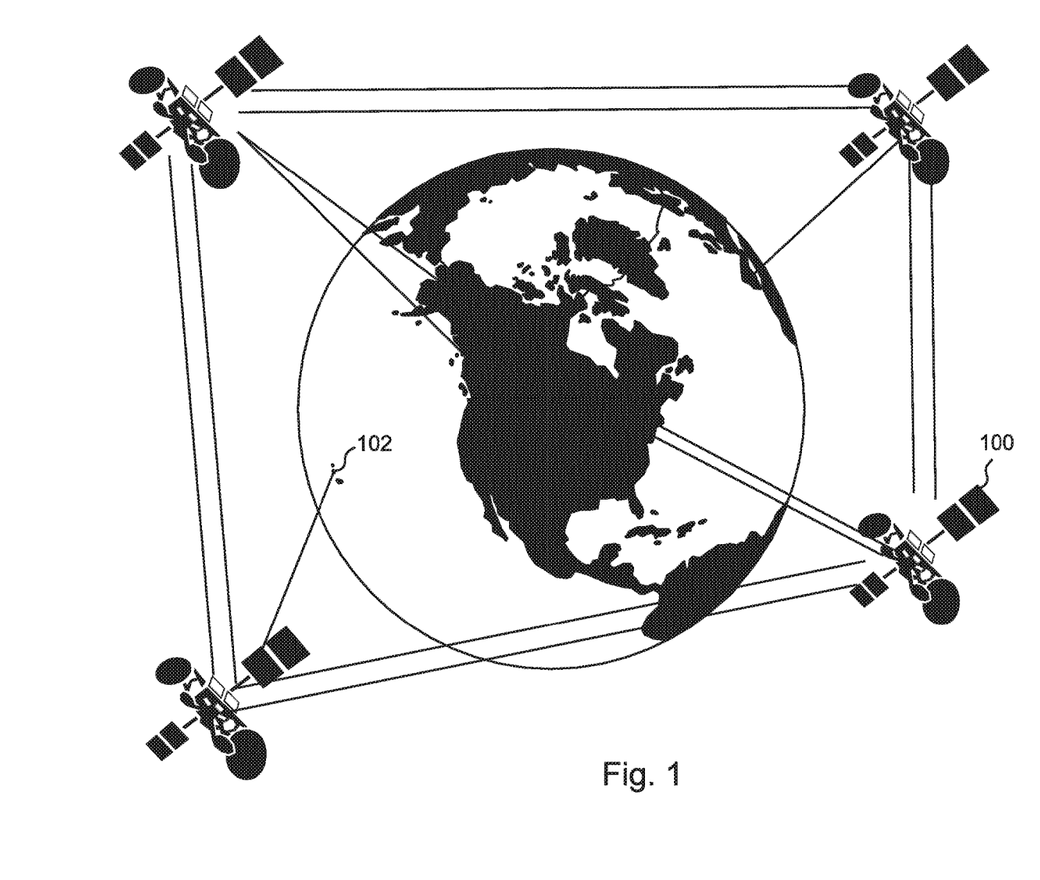
FIG. 1 illustrates laser communication between orbiting satellites, and between the satellites and ground-based nodes.

With reference to FIG. 1, laser communications holds great promise for multi-Gbps (Giga-bits per second) connections between space platforms 100, as well as between ground-based nodes 102 and space platforms 100, owing to the availability of efficient, multi-watt laser sources and exceedingly high antenna gain, having beam widths of only 10-20 micro-radians, and telescope apertures that are only four to eight inches in diameter. And even when much lower data rates of tens to hundreds of mega-bits per second (Mbps) are of interest, laser communication may be desirable due to its Low Probability of Intercept (LPI), Low Probability of Detection (LPD) and anti-jam communications link security.

It should be noted that the disclosure herein is mainly presented with reference to satellite communication. However, it will be understood by those of skill in the art that the present disclosure is not limited to satellite communication, but also applies to other implementations of laser communication.

Of course, there are certain problems associated with laser communication that arise specifically from the focused nature of laser beams. In particular, it is necessary for communicating nodes to identify each other and align their lasers so as to effectively communicate. In the case of satellite laser communication, these identification and alignment problems are especially acute, because laser sources that are well separated by terrestrial standards, for example several miles apart from each other, may nevertheless appear to be almost geographically overlapping from the viewpoint of a satellite. Furthermore, thermal and other effects of the atmosphere can lead to angular (apparent location) shifting of an incident laser communication beam, even after it is identified and aligned. These angular vibrational effects, together with short-term mechanical instabilities of the satellite or other receiving node, are referred to herein collectively as "jitter."

Figure 2:
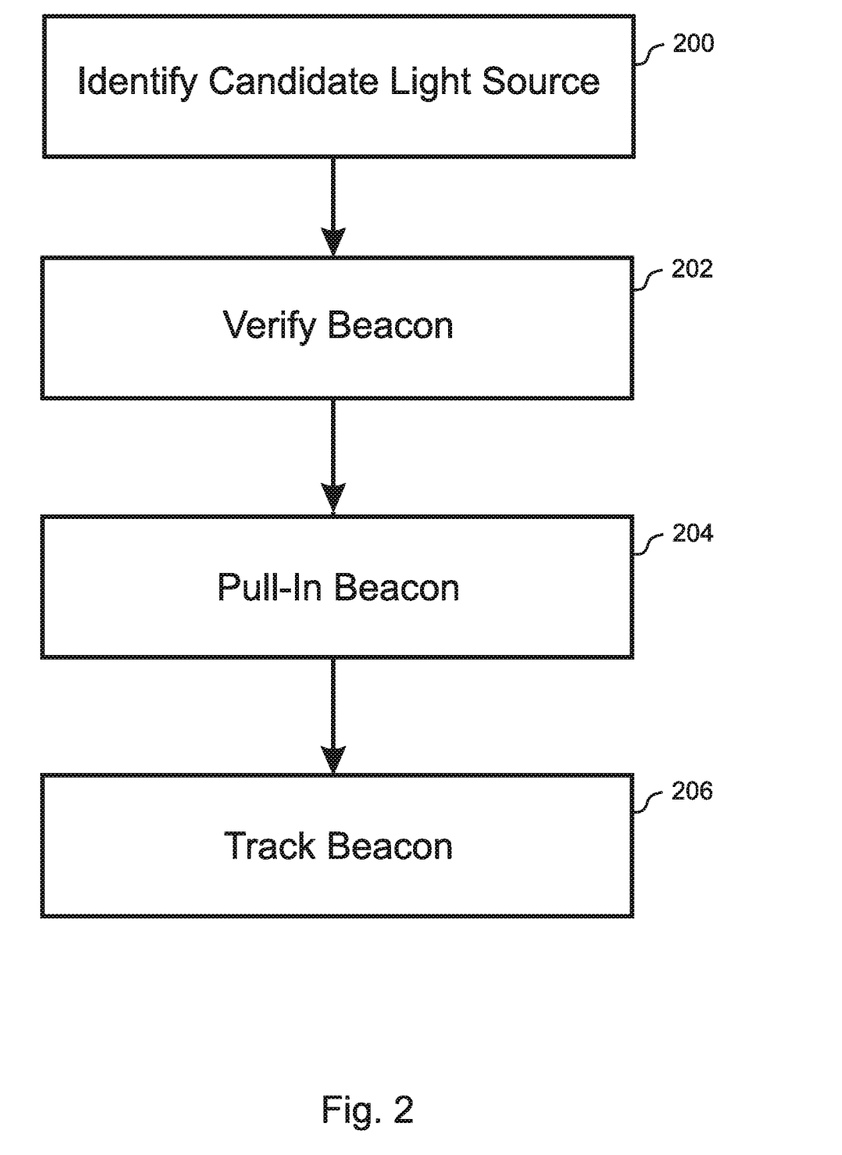
FIG. 2 is a flow diagram illustrating steps required for establishing and maintaining alignment between a laser communication receiving system and a transmitting node.

With reference to FIG. 2, there are at least four steps that must be accomplished so as to establish and maintain laser communications. First, a candidate light source, referred to herein as a "hotspot," must be identified from within a scene of interest 200. Second, the hotspot must be verified as being a laser communication signal, and its transmission source must be identified so as to determine if it is a signal of interest 202. Third, the optics of the laser communication receiving system must be aligned with the incoming beam 204, and finally, once communication has been established, the beam must be tracked during communication, so that the alignment of the "centroid" of the beam with the signal receiving sensor is maintained and the communication is not interrupted 206.

In addition to jitter, tracking of a beam that is a signal of interest can be made even more difficult if there are other hotspots located within the scene of interest, especially if some of these other hotspots are stronger than the signal of interest, and/or located geographically close to the transmitting node of the signal of interest. The problem is made even worse if these other, competing hotspots vary in amplitude over time, possibly even appearing and disappearing.

Accordingly, there is a need for a more reliable and accurate apparatus and method for identifying, aligning, and tracking a beam that is carrying a laser communication signal of interest, including under conditions where other, possibly stronger hotspots are present within the scene of interest that may vary in amplitude, possibly even appearing and disappearing as a function of time.

SUMMARY

A reliable and accurate apparatus and method are disclosed for identifying, aligning, and tracking a laser beam "hotspot" that is carrying a laser communication signal of interest. Embodiments of the disclosed method and apparatus provide reliable alignment and tracking even when other, possibly stronger hotspots are present within the scene of interest that may vary in amplitude, and may even appear and disappear as a function of time.

According to the present disclosure, incident light from the scene is directed onto a focal plane array (FPA) by a beam-directing device, which is under control of a controller. As indicated in FIG. 2, candidate signal sources, referred to as "hotspots," are identified within the scene 200. In embodiments, this step includes applying a sliding "window" to the FPA that groups the pixels in the FPA into squares of six pixels by six pixels, designating local maximum pixels within the squares as hotspots, and estimating the centroids of the hotspots. The hotspots are then evaluated to identify an "SOI" hotspot that carries a laser communication "signal of interest."

Once the SOI hotspot is identified, the controller is responsible for positioning and maintaining the centroid of the SOI hotspot, also sometimes referred to herein simply as the "SOI," at a designated tracking location on the FPA, which is typically the center of the FPA. This initial positioning of the SOI at the tracking location on the FPA represents the "pull in" alignment step 204 of FIG. 2, and the subsequent maintaining of this alignment represents the "tracking" step 206 of FIG. 2.

In embodiments, it is assumed that the location of the centroid of the SOI, and the alignment and tracking thereof, must be determined and controlled with an accuracy that is on the order of a fraction of the size of an FPA pixel. In some of these embodiments, a "quad-cell" approach is employed by the controller, whereby the pixels of the FPA are divided into square groups of four adjacent pixels, referred to herein as "quad-cells," which for convenience are identified by the indices of the pixels at the lower left corners of the squares.

In these "quad-cell" embodiments, after identifying the hotspots within the scene of interest, one of the hotspots is verified as a laser communication signal of interest ("SOI"), and all of the other hotspots are designated as competing hotspots. The controller then proceeds to adjust the beam-directing device until the SOI is located within a specified "tracking" quad-cell, which is typically the quad-cell at the center of the FPA. In some of these embodiments, this initial alignment is accomplished simply by adjusting the beam-directing device until the "local maximum" pixel associated with the SOI is one of the pixels of the tracking quad-cell.

Once the SOI is within the tracking quad-cell, the controller further improves the alignment by comparing the signal amplitudes produced by the four pixels within the tracking quad-cell (the "pixel amplitudes"), and estimating the offset of the SOI centroid within the quad-cell according to the differences between the pixel amplitudes. The beam-directing device is then adjusted by the controller until the SOI centroid is determined to be centered in the quadcell. In some embodiments, the position of the SOI centroid within the tracking quad-cell is estimated according to the pixel amplitudes by assuming that the SOI is a circular spot with a sharp boundary, whereby the SOI centroid is aligned when the pixel amplitudes of the tracking quad-cell are all equal to each other. In similar embodiments, the SOI is assumed to have a Gaussian profile, or a circular profile with edges that fall off as Gaussians.

Embodiments employ the same quad-cell process to estimate the centroid locations of the competing hotspots, and their relative offsets from the centroid of the SOI.

Once the SOI centroid has been aligned with the tracking location of the FPA, the SOI alignment is maintained by repeatedly and continuously estimating the SOI centroid location, and causing the beam-directing device to be continuously adjusted so as to maintain alignment of the SOI centroid at the tracking location on the FPA.

In embodiments, the laser communication signal of interest comprises two overlapping, co-linear beam components that are transmitted at different wavelengths, whereby communicated data is encoded on one of the two beam components (the signal component), while the other beam component is a "beacon" that is used to identify the source of the laser communication signal to the satellite or other laser signal receiving node (the beacon component). In some embodiments, the two overlapping, co-linear beam components of the laser communication signal are spatially separated from each other by the disclosed apparatus, such that the beacon component is directed to the FPA and is used for alignment and tracking of the hotspot of interest, while the signal component is simultaneously directed to a data-receiving sensor.

As is noted above, tracking of a signal (or beacon) of interest can be difficult if other, competing light sources are present in the scene of interest, especially if one or more of these competing light sources is geographically close to the node that is transmitting the SOI. The tracking becomes even more difficult if one or more of these competing hotspots is stronger than the SOI, and especially if these other, competing hotspots vary in amplitude over time, possibly even appearing and disappearing.

In embodiments of the present disclosure, it is assumed that any competing light sources (hotspots) are fixed in position relative to the SOI, or at least that their relative positions are changing slowly in comparison to the timescales over which data is transmitted by the SOI. This is generally the case, for example, when laser communication signals are received by a satellite. Under this assumption, rather than attempting to exclude competing hotspots from the SOI centroid estimation, in embodiments of the present disclosure the competing hotspots are included in a multi-spot calculation, whereby the SOI centroid location estimates are improved due to inclusion in the calculation of additional measurement data pertaining to the competing hotspots. The improvement can be especially significant in cases where the competing hotspots are stronger light sources than the SOI.

In some of these embodiments, a mathematical "multi-spot" model is used as the basis for estimating the centroids of both the SOI and the competing hotspots, which are referred to collectively herein as the "tracked light sources." According to this approach, in embodiments a single "multi-spot" calculation is performed that results in centroid estimates for all of the tracked light sources, rather than performing separate calculations for each of the tracked light sources in the scene.

Of course, the origins of competing hotspots are generally not known to the controller. They may arise from competing laser communication signals, transmitted by friendly or hostile entities. They may also arise from naturally occurring features such as locations filled with water or ice, from metallic structures or other reflective objects, or even from hostile jamming sources. Accordingly, under many circumstances it can be assumed that the intensities of competing hotspots may not be constant, and may even appear and disappear over time. And of course, even for a "constant" light source, the apparent intensity will vary due to the atmospheric effects that can be referred to generically as "scintillation."

Embodiments of the present disclosure compensate for amplitude variability of the SOI and competing hotspots by weighting their contributions to the multi-spot estimation according to their intensities. In other words, the estimated locations of the SOI and competing hotspots are given more relative weight as they grow stronger, and less relative weight as they grow weaker. And if a competing hotspot disappears entirely, it is given a weight of zero, and thereby excluded from the estimation altogether. In this way, the quality of each centroid observation is linked to the strength of that observation, and thus to its signal-to-noise ratio, such that when a competing hotspot disappears, observations of the centroid of that hotspot are unweighted and thereby no longer included in the multi-spot estimation. And when a new competing hotspot appears, it can be added to the estimation process and can begin to serve as an additional source of observation information and estimation accuracy.

One general aspect of the present disclosure is a method of identifying and tracking a laser communication signal of interest. The method includes directing incident light from a scene onto a focal plane array (FPA), designating a plurality of light intensity maxima detected by the FPA as hotspots belonging to a group of hotspots, identifying one of the hotspots in the group of hotspots as a laser communication signal of interest (SOI), and designating the other hotspots in the group of hotspots as competing hotspots, adjusting an incident direction of the incident light from the scene so as to align the laser communication SOI with a laser data receiver, measuring location and amplitude data for each of the hotspots in the group of hotspots, performing a multi-spot estimation of a centroid of the laser communication SOI under an assumption that relative locations of all of the hotspots in the group of hotspots are constant, said multi-spot estimation comprising applying a Kalman filter to the location data measured for the hotspots, the location data for each of said hotspots being weighted according to a magnitude of the amplitude data measured for said hotspot, so that the result of the multi-spot estimation is more strongly influenced by hotspots for which the measured amplitude data is stronger, and less strongly influenced by hotspots for which the measured amplitude data is weaker, and adjusting the incident direction of the light from the scene as needed to maintain alignment of the laser communication SOI with the laser data receiver.

In embodiments, aligning the laser communication SOI with the laser data receiver includes positioning the laser communication SOI at a tracking location on the FPA.

In any of the above embodiments, designating a plurality of light intensity maxima detected by the FPA as hotspots can include considering pixels of the FPA in a sliding window that defines square pixel groups of six by six pixels, and designating pixels within the pixel groups having output amplitudes that are local maxima as hotspots.

In any of the above embodiments, for each of the hotspots, measuring the location information for the hotspot can include identifying a quad-cell of the FPA within which the hotspot is located, the quad-cell being a group of four adjacent pixels of the FPA arranged in a square, and estimating a centroid of the hotspot according to relative output amplitudes of the four pixels of the quad-cell.

In any of the above embodiments, the laser communication SOI can include a signal component and a beacon component that differ from each other in wavelength, said components being overlapping and parallel. Some of these embodiments further include separating beacon light having the beacon component wavelength from the incident light, and directing only the beacon light onto the FPA.

In any of the above embodiments, the multi-spot estimation of the centroid of the laser communication SOI can have an estimation error that is less than a smallest dimension of each of the pixels of the FPA. Some of these embodiments further include repeating the step of designating a plurality of light intensity maxima as hotspots, whereby newly appearing hotspots are added to the group of hotspots and previously designated hotspots that are not detected are deleted from the group of hotspots.

Another general aspect of the present disclosure is an apparatus for tracking a laser communication signal of interest. The apparatus includes a beam-directing device configured to direct incident light from a scene onto a focal plane array (FPA), a hotspot identifier configured to receive light intensity data from the FPA, to designate a plurality of maxima of the FPA light intensity data as hotspots belonging to a group of hotspots, and to determine amplitude and location information pertaining to the hotspots, a signal identifier configured to identify one of the hotspots as the laser communication signal of interest (SOI), a laser data receiver, and a controller configured to accept data pertaining to the incident light from the FPA, hotspot identifier, and signal identifier.

The controller is configured to estimate a location of a centroid of the laser communication SOI, according to the estimated location of the SOI centroid, cause the beam-directing device to adjust an incident direction of the incident light from the scene so as to align the laser communication SOI with the laser data receiver, perform a multi-spot estimation of the centroid location of the laser communication SOI under an assumption that relative locations of all of the hotspots in the group of hotspots are constant, said multi-spot calculation comprising applying a Kalman filter to the location data pertaining to the hotspots, the location data for each of said hotspots being weighted according to a magnitude of the amplitude data pertaining to said hotspot, so that the result of the multi-spot calculation is more strongly influenced by hotspots having stronger amplitude data, and less strongly influenced by hotspots having weaker amplitude data, and cause the beam-directing device to adjust the incident direction of the light from the scene as needed to maintain alignment of the laser communication SOI with the laser data receiver, so that the laser data receiver is able to receive wireless data from the laser communication signal of interest.

Embodiments further include a beam dividing device configured to separate overlapping and parallel laser beam components of differing wavelengths included in the laser communication SOI, one of said components being a beacon component. In some of these embodiments, the beam dividing device comprises at least one of a diffraction grating, a prism, a beam splitter, and a bandpass filter. In any of these embodiments, the beam dividing device can be configured to direct the beacon component onto the FPA, while directing at least one other of the components onto the laser data receiver. And in some of these embodiments, the controller is configured to align the laser communication SOI with the laser data receiver by aligning the beacon component of the laser communication SOI with a tracking location of the FPA.

In any of the above embodiments, the hotspot identifier can be configured to determine location information pertaining to each of the hotspots by identifying a quad-cell of the FPA within which the hotspot is located, the quad-cell being a group of four adjacent pixels of the FPA arranged in a square; and estimating a centroid of the hotspot according to relative output amplitudes of the four pixels of the quad-cell.

In any of the above embodiments, the controller can be configured to perform the multi-spot estimation with an error that is less than a smallest dimension of each of the pixels of the FPA.

And in any of the above embodiments, the hotspot identifier can be further configured to periodically update the group of hotspots, whereby newly appearing hotspots are added to the group of hotspots and previously designated hotspots that are no longer detected are deleted from the group of hotspots.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a reliable and accurate apparatus and method for identifying, aligning, and tracking a laser beam "hotspot" that is carrying a laser communication signal of interest, also referred to herein as an "SOI" hotspot, or simply as an "SOI." Embodiments of the disclosed method and apparatus provide reliable alignment and tracking of an SOI even when other, possibly stronger hotspots are present within the scene of interest that may vary in amplitude, and may even appear and disappear as a function of time.

Figure 3:
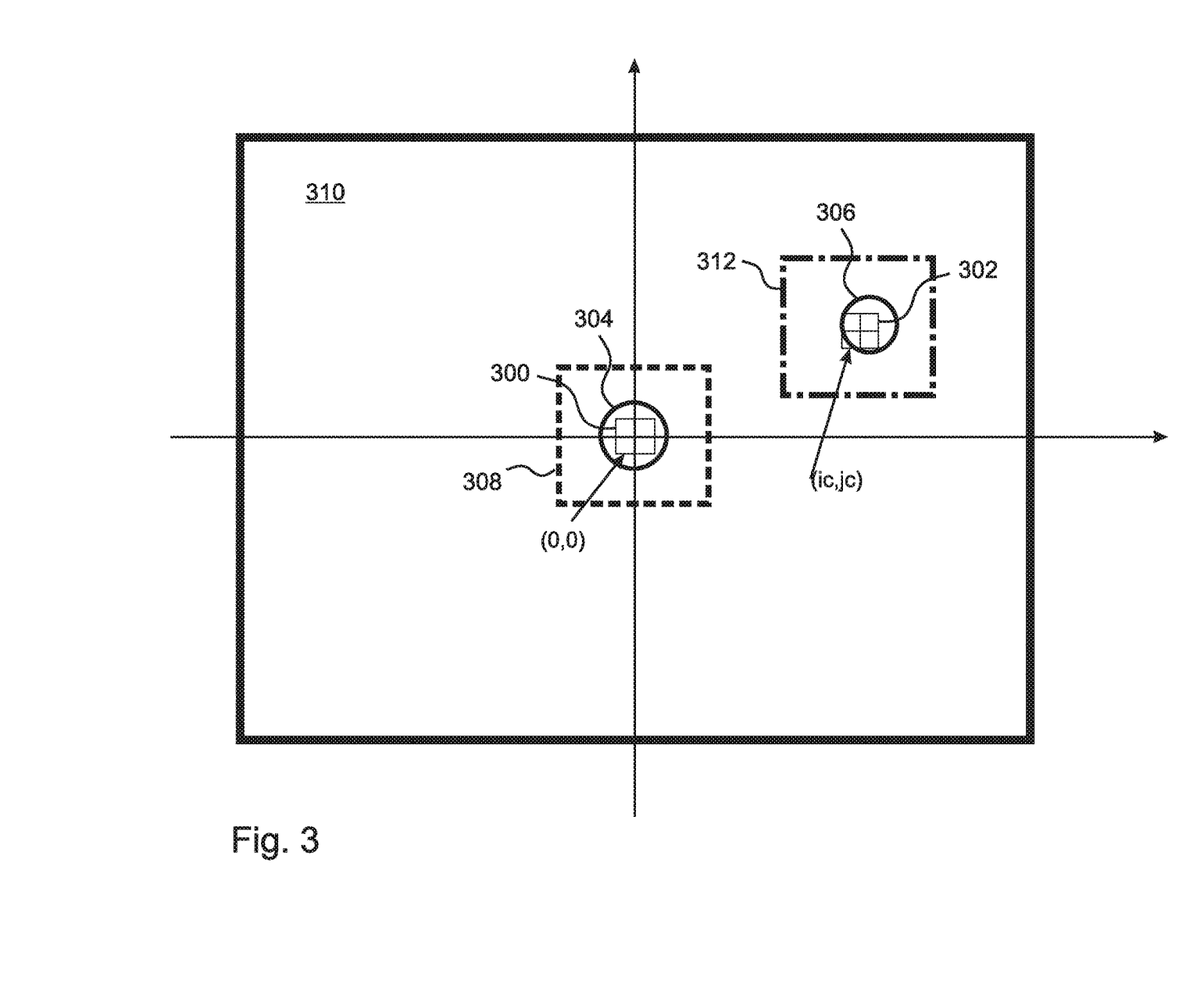
FIG. 3 illustrates quad-cell estimation of a light source location.
Figure 4A:
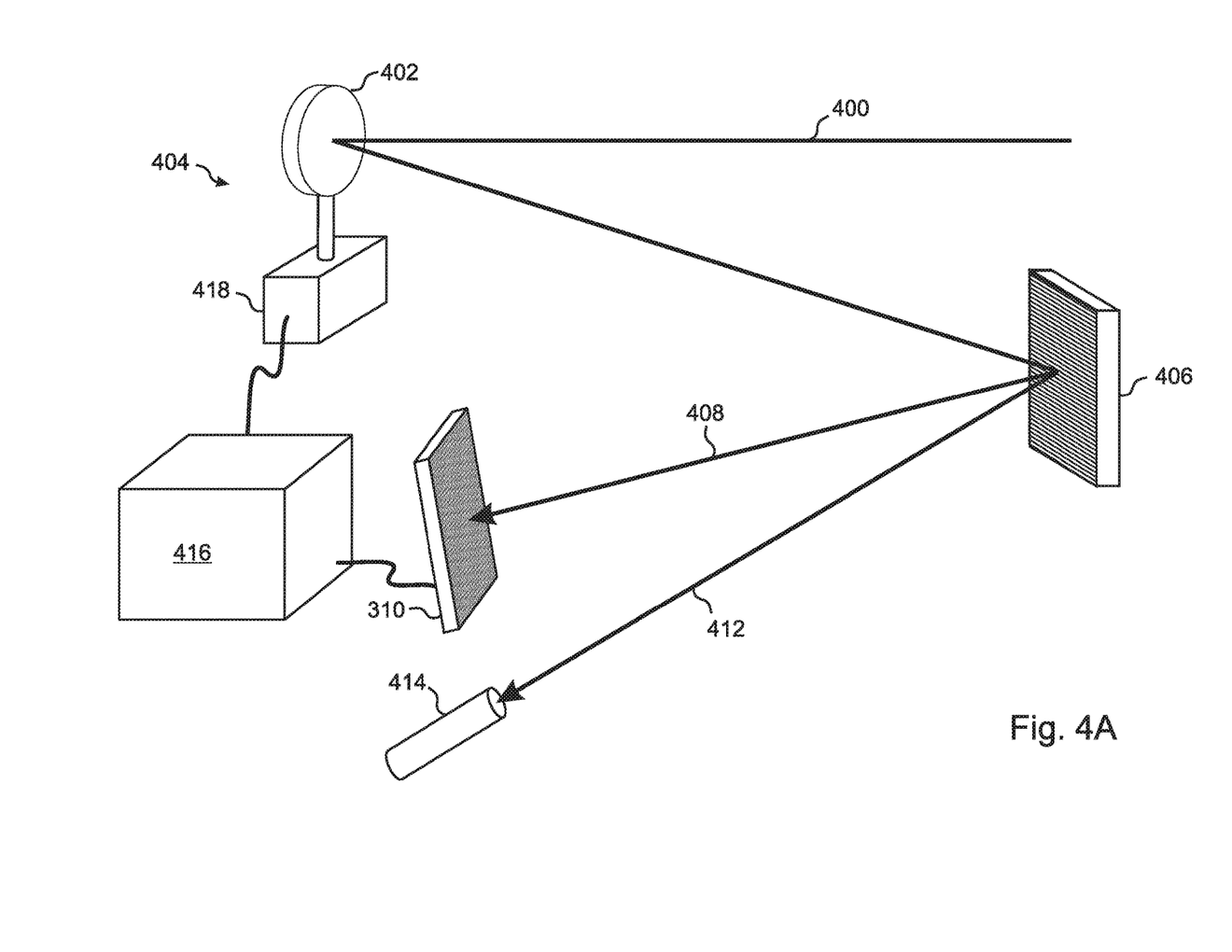
FIG. 4A is a block diagram that illustrates components of a laser communication receiving apparatus according to an embodiment of the present disclosure.

According to the present disclosure, with reference to FIGS. 3 and 4A, a frame of incident light 400 from a scene of interest is directed onto a focal plane array ("FPA") 310 by a beam-directing device 404, which in the embodiment of FIG. 4A includes a mirror 402 driven by a servo motor 418 that is under control of a controller 416. Narrow beams of light arising from the scene of interest that are candidate laser communication signals give rise to "spots" of light within the frame 400, referred to herein as "hotspots" 304, 306, that are more intense than a surrounding background light intensity of the frame 400.

Figure 4B:
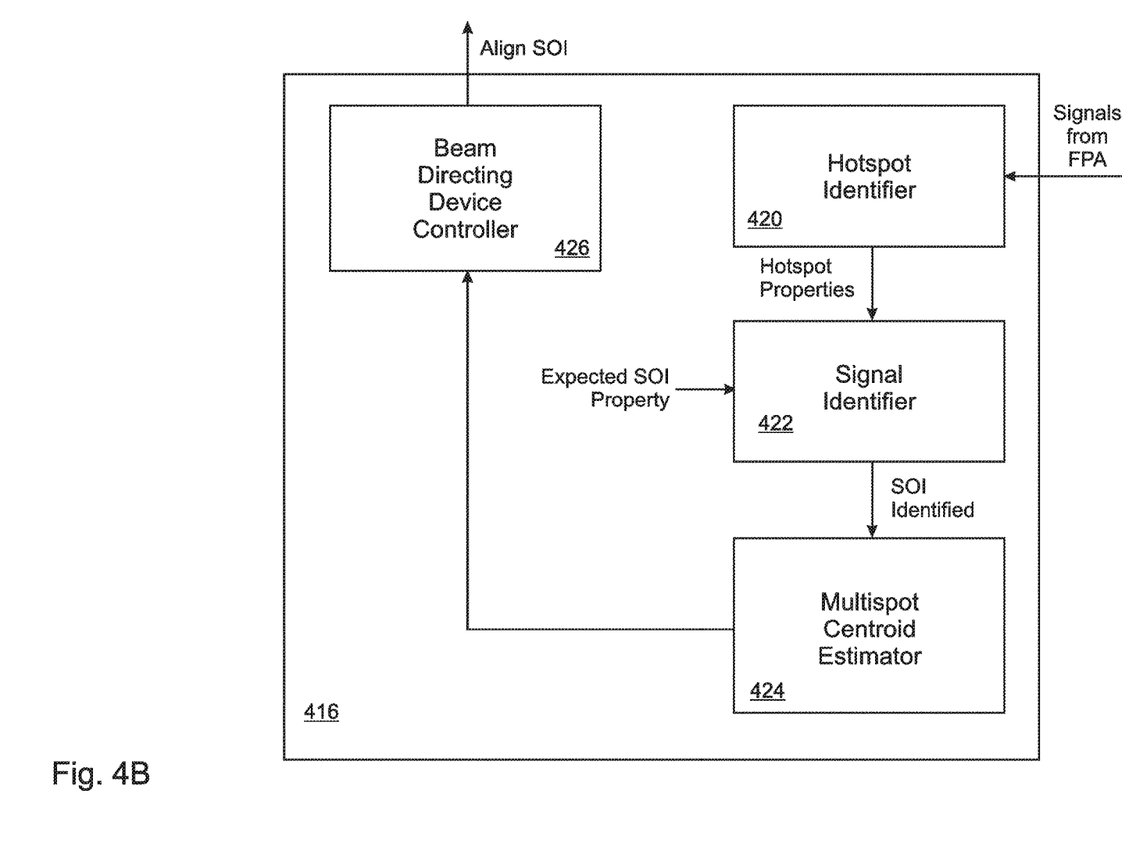
FIG. 4B is a block diagram illustrating details of the structure of a controller in an embodiment of the present disclosure.

With reference to FIG. 4B, a "hotspot identifier" 420, which may be physically part of the controller 416, is used to identify 200 the hotspots 304, 306 within the frame of light 400 that is incident on the FPA 310. With reference again to FIG. 3, in embodiments this step includes applying a sliding "window" to the FPA 310 that divides the FPA pixels into squares of pixels 308, 312, which in embodiments are 6×6 squares of pixels. For each of the pixel squares 308, 312, the signal intensities arising from the pixels in the square are compared. If the strongest signal intensity in a square is reported by a pixel that is not at the boundary of the square, that pixel is designated as a local maximum pixel, and the beam of light that is striking the local maximum pixel is designated as a hotspot.

Once the local maximum pixels have been identified, a signal identifier 422 is used to identify a hotspot that is a signal of interest 400 ("SOI"). Once the SOI 400 has been identified, the controller 416 directs a beam directing device 404 to position the SOI at a tracking location on the FPA, typically at the center of the FPA. This initial positioning of the SOI 302 on the FPA 310 represents the "pull in" alignment step 204 of FIG. 2. The subsequent maintaining of this alignment represents the "tracking" step 206 of FIG. 2.

In embodiments, it is assumed that location of the centroid of the SOI 304 on the FPA 310, and thereby the alignment and tracking of the SOI 304 on the FPA 310, must be determined and controlled with an accuracy that is on the order of a fraction of the size of an FPA pixel. In some of these embodiments, a "quad-cell" approach is employed, whereby the pixels of the FPA are divided into square groups of four adjacent cells 300, 302, referred to herein as "quad-cells," which for convenience are identified by the indices of the pixels at the lower left corners of the squares. In FIG. 3 the axes at the center of the FPA 310 fall between the pixels 300 at the FPA center, as shown.

In these "quad-cell" embodiments, after identifying the hotspots 304, 306 and verifying that one of the hotspots 304 is a laser communication signal of interest ("SOI"), the controller 416 adjusts the beam-directing device 404 until the SOI 304 is located within a specified "tracking" quad-cell 300, which is typically the quad-cell 300 at the center of the FPA 310. In some of these embodiments, this initial alignment is accomplished simply by causing the servo 418 to adjust the mirror 402 of the beam-directing device 404 until the "local maximum" pixel associated with the SOI 304 is one of the pixels of the tracking quad-cell 300.

In the example of FIG. 3, the quad-cell 300 at the center of the FPA 310 is the "tracking" quad-cell, and is identified by the index that corresponds to the pixel (0,0) in the lower corner of the cell 300.

Once the SOI 304 is within the tracking quad-cell 300, the controller 416 further improves the alignment of the SOI by comparing the signal amplitudes produced by the four pixels within the tracking quad-cell 300 (the "pixel amplitudes"), and estimating the offset of the SOI centroid within the tracking quad-cell 300 according to the differences between the pixel amplitudes. The beam-directing device 404 is then adjusted by the controller 416 until the pixel amplitudes of the tracking quad-cell 300 are all equal to each other. In some embodiments, the position of the SOI centroid within the tracking quad-cell 300 is estimated according to the pixel amplitudes by assuming that the SOI 304 is a circular spot with a sharp boundary, as illustrated in FIG. 3. In other embodiments, the SOI 304 is assumed to have a Gaussian profile, or a circular profile with edges that fall off as Gaussians. In embodiments, the calculated location of the SOI centroid is continuously updated, and is used by the controller 416 in determining the adjustments that must be made by the beam-directing device 404 to maintain alignment of the SOI centroid on the FPA 310.

With continued reference to FIG. 4A, in embodiments laser communication signals of interest 400 comprise two overlapping, co-linear beam components 408, 412 that are transmitted at different wavelengths, whereby one of the two beam components 412 is used for data communication, and the other of the two beam components 408 is a "beacon" that is used to identify the laser communication signal source to the satellite 100 or other laser signal receiving node. In the embodiment of FIG. 4A, the incoming light 400 is directed by the beam directing device 404, which in FIG. 4A includes a steering mirror 402 driven by a servo-motor 418, onto a beam dividing device 406 that spatially separates the two components 408, 412 from each other, so that the "beacon component" 408 is directed to a focal plane array 310 while the signal component 412 is directed to a laser data receiver 414. In similar embodiments, the two components 408, 412 are separated by other mechanisms, which can include prisms, beam splitters, gratings, and/or bandwidth filters. The SOI beacon 408 is aligned with the FPA 301, causing the signal component 412 to be simultaneously aligned with a signal sensor 414.

As is noted above, tracking of a signal (or beacon) of interest can be difficult if other, competing light sources are present in the scene of interest, especially if one or more of these competing light sources is geographically close to the node that is transmitting the SOI. The tracking becomes even more difficult if one or more of these competing hotspots is stronger than the SOI. For example, in FIG. 3, a competing hotspot 306 is also incident on the FPA 310. The competing hotspot 306 is shown as incident on a quad-cell having indices ($i_C$, $j_C$).

In embodiments of the present disclosure, it is assumed that any competing light sources 306 are stationary relative to the SOI 304, or at least that their relative positions are changing slowly in comparison to the timescales over which data is transmitted by the SOI 304, as is generally the case, for example, when laser communication signals are received by a satellite 100. Under this assumption, rather than attempting to exclude competing hotspots 306 from the SOI centroid estimation, embodiments of the present disclosure use a multi-spot centroid estimator 424 to track the SOI and maintain its alignment with the laser data receiver 414. The multi-spot centroid estimator 424 includes the competing hotspots 306 in a multi-spot estimation, and thereby improves the SOI centroid estimation, especially in cases where the competing hotspots 306 are stronger light sources than the SOI 304.

Figure 4C:
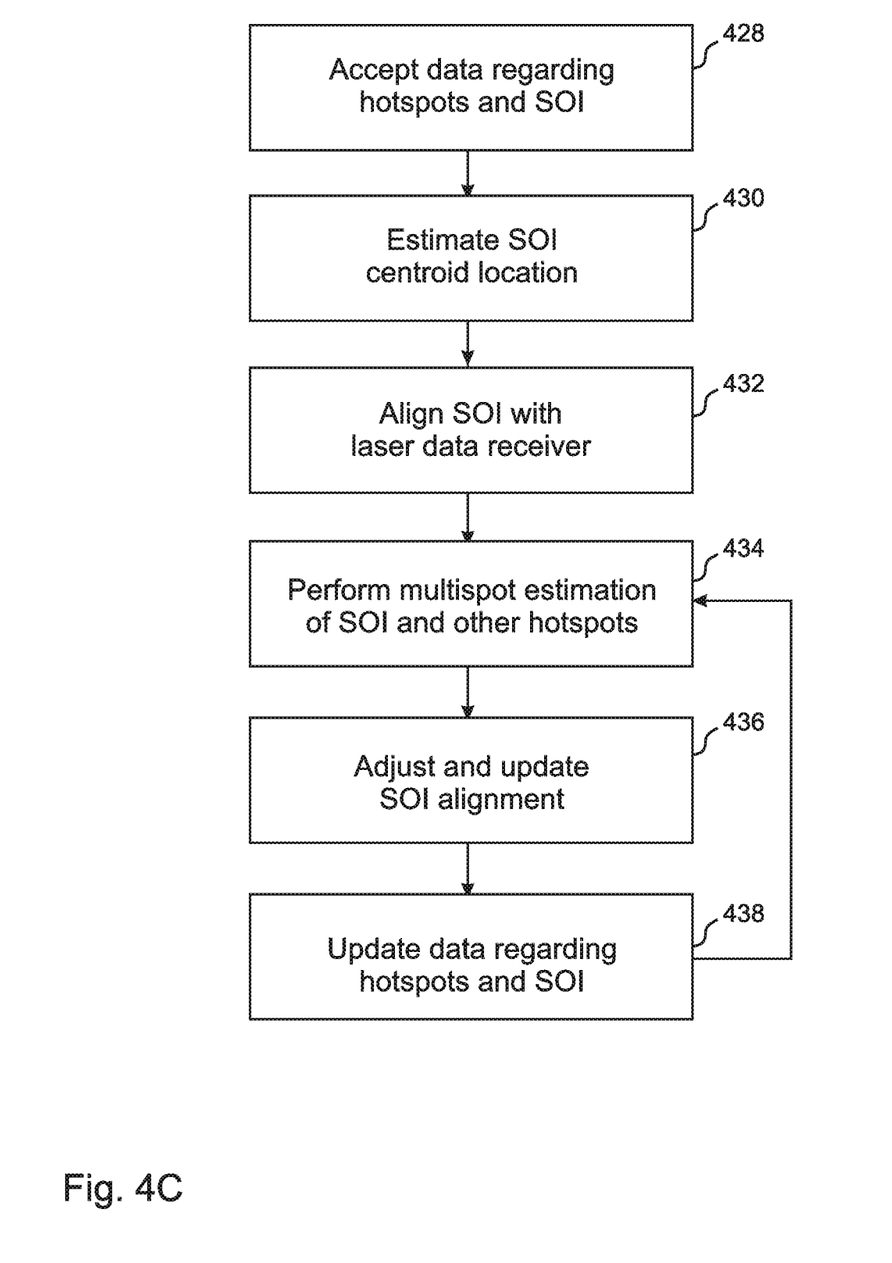
FIG. 4C is a flow diagram illustrating steps performed by the controller of FIG. 4B in embodiments of the present disclosure.

FIG. 4C is a flow diagram that illustrates steps performed by the controller 416 in embodiments of the present disclosure. After accepting data 426 from the hotspot identifier 420 and identification of the SOI by the signal recognizer 422, the controller 416 estimates the SOI centroid location 430 of the SOI, possibly using the quad-cell approach described above, and aligns 432 the SOI with the laser data receiver 414. After this initial alignment of the SOI, the controller 416 uses the multi-spot centroid estimator 424 to perform a multi-spot estimation 434 of the SOI centroid location, and then uses the beam directing device 404 to update and adjust the SOI alignment 436 according to the result of the multi-spot estimation. The controller proceeds to periodically update its data 436 regarding the centroids of the SOI and other hotspots, and repeats the multi-spot calculation and SOI realignment as needed to compensate for jitter and maintain alignment with the SOI.

In some of these embodiments, a mathematical, "multi-spot" model is used as the basis for estimating the centroids of both the SOI 304 and the competing hotspots 306. According to this approach, in embodiments a single, "multi-spot" calculation is performed that results in estimates of the centroids for all of the tracked light sources 304, 306, rather than performing separate calculations for each of the tracked light sources 304, 306 in the scene.

Of course, the origins of competing hotspots 306 are generally not known to the controller. They may arise from competing laser communication signals, transmitted by friendly or hostile entities. They may also arise from naturally occurring features such as locations filled with water or ice, from metallic structures or other reflective objects, or even from hostile jamming sources. Accordingly, under many circumstances it can be assumed that the intensities of competing hotspots 306 may not be constant, and may even appear and disappear over time. And of course, even for a "constant" light source, the apparent intensity will vary due to the atmospheric effects that can be referred to generically as "scintillation."

Embodiments of the present disclosure compensate for amplitude variability of the SOI 304 and competing hotspots 306 by weighting their contributions to the multispot estimation according to their intensities. In other words, the estimated locations of the SOI 304 and competing hotspots 306 are given more weight as they grow stronger, and less weight as they grow weaker. And if a competing hotspot 306 disappears entirely, it is given a weight of zero, and thereby excluded from the estimation altogether. In this way, the quality of each centroid observation is linked to the strength of that observation, and thus to its signal to noise ratio, such that when a competing hotspot disappears, observations of the centroid of that hotspot are unweighted and thereby no longer included in the multi-spot estimation. And when a new competing hotspot appears, it can be added to the estimation process and can begin to serve as an additional source of observation information and estimation accuracy.

Figure 5A:
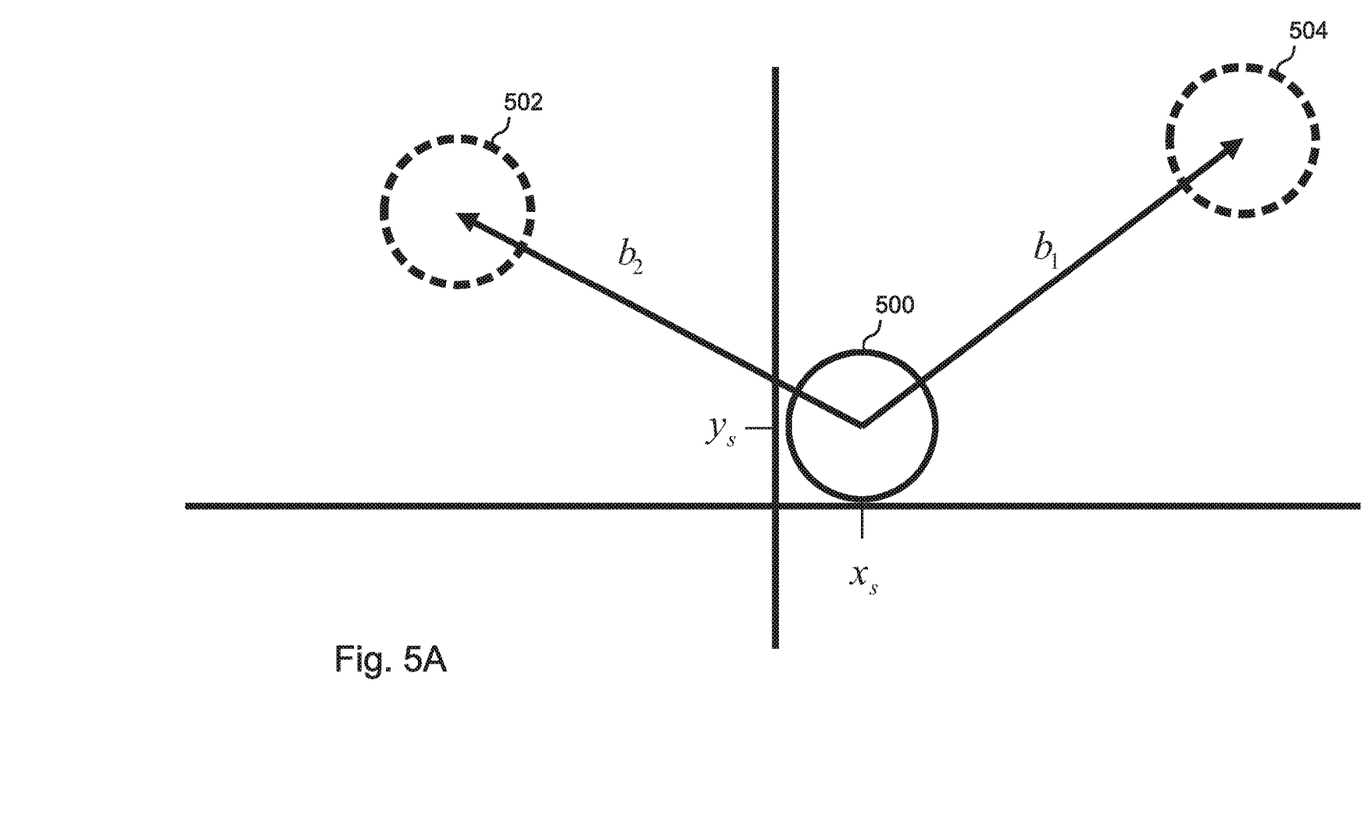
FIG. 5A illustrates relative positions of an SOI and two competing hotspots.

FIG. 5A presents an example where a "multi-spot" analysis can be used to simultaneously estimate the centroid location of an SOI 500 and two competing hotspots 502, 504. It is assumed that the SOI 500 and the two competing hotspots 502, 504 have fixed locations relative to each other, and that they move in tandem within the scene. The problem is then to estimate the location of the centroid 500 of the SOI $\{x_s, y_s\}$ by combining centroid data measured for each of the "spots" 500, 502, 504. It is assumed that the accuracy of the estimate must be radially better than the size of a single pixel of the FPA 310, and that the intensities of the two competing hotspots 502, 504 can vary at any time and according to any pattern, including completely disappearing and reappearing, and that a specified SOI location accuracy must be maintained despite these variations in competing hotspot intensity.

Figure 5B:
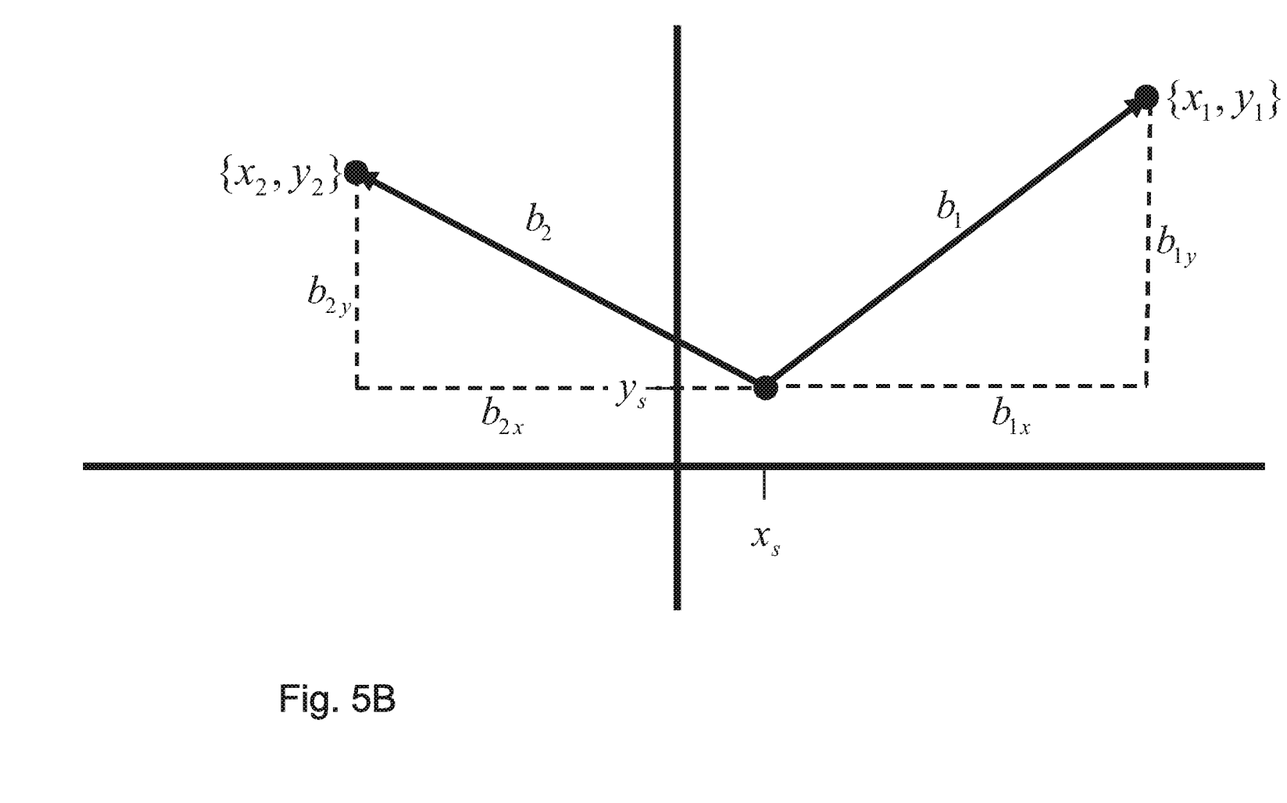
FIG. 5B illustrates a mathematical formulation of the relative positions of FIG. 5A.

With reference to FIG. 5B, the problem can be formulated according to observations of the centroids of the competing hotspots 502, 504 as follows:

TABLE 1

State and observation equations for multi-spot centroid estimation

| State Equations | Observation Equations |
|---|---|
| $x_s = 0 + w_{sx}$ | $z_{xs} = x_s$ |
| $y_s = 0 + w_{sy}$ | $z_{x1} = x_s + b_{1x}$ |
| $b_{1x} = 0 + w_{1x}$ | $z_{x2} = x_s + b_{1y}$ |
| $b_{1y} = 0 + w_{1y}$ | $z_{ys} = x_s$ |
| $b_{2x} = 0 + w_{2x}$ | $z_{y1} = x_s + b_{2x}$ |
| $b_{2y} = 0 + w_{2y}$ | $z_{y2} = x_s + b_{2y}$ | where the w terms are process noise signals. According to this approach, the SOI centroid is modeled as a random walk process (integral of white noise) and the fixed offsets are modeled as biases that are driven by weak process noise representing the assumption that they vary slowly.

This $6^{th}$ order problem can be solved as 2 independent $3^{rd}$ order problems, solving for x and y separately. Accordingly, the equations used to solve for x are:

TABLE 2

State and observation equations for estimating x

| State Equations | Observation Equations |
|---|---|
| $x_s = 0 + w_{sx}$ | $z_{xs} = x_s$ |
| $b1_x = 0 + w_{1x}$ | $z_{x1} = x_s + b_{1x}$ |
| $b2_x = 0 + w_{2x}$ | $z_{x2} = x_s + b_{2x}$ |

The goal is then to obtain an "optimal" estimate of the SOI centroid location, given the three centroid observations, and also to estimate the fixed biases as part of the solution. The problem can be expressed in vector format as $x=Ax+w$ and $y\ Cx+v$ as follows:

$$\begin{bmatrix} x_s \\ b_{1x} \\ b_{2x} \end{bmatrix} = \begin{bmatrix} 0 & 0 & 0 \\ 0 & 0 & 0 \\ 0 & 0 & 0 \end{bmatrix} \begin{bmatrix} x_s \\ b_{1x} \\ b_{2x} \end{bmatrix} + \begin{bmatrix} w_s \\ w_{1x} \\ w_{2x} \end{bmatrix} \quad (1)$$

$$\begin{bmatrix} z_{xs} \\ z_{x1} \\ z_{x2} \end{bmatrix} = \begin{bmatrix} 1 & 0 & 0 \\ 0 & 1 & 0 \\ 0 & 0 & 1 \end{bmatrix} \begin{bmatrix} x_s \\ b_{1x} \\ b_{2x} \end{bmatrix} + \begin{bmatrix} v_s \\ v_{1x} \\ v_{2x} \end{bmatrix} \quad (2)$$

Where the square matrices in Eqns. 1 and 2 are A and C, respectively, and where the vector v in Eqn. 2 represents the observation noise process.

The Kalman filter equations can be applied to the solution of this problem as follows:

$$K = PC'V^{-1} \quad (3)$$

$$P = W - KCP \quad (4)$$

$$\hat{x} = K(z - C\hat{x}) \quad (5)$$

where Eqn. 3 is the equation for the Kalman gain K, Eqn. 4 is the equation for the covariance matrix P, and Eqn. 5 is the state estimate equation. In Eqn. 5, z is the vector of observations. In Eqns. 3 and 4, the W and V matrices are the process and observation noise spectral density matrices, which are given by $$W = \begin{bmatrix} w_s & 0 & 0 \\ 0 & w_{b1} & 0 \\ 0 & 0 & w_{b1} \end{bmatrix} \quad (6)$$

$$V = \begin{bmatrix} v_s & 0 & 0 \\ 0 & v_{b1} & 0 \\ 0 & 0 & v_{b1} \end{bmatrix} \quad (7)$$

where the diagonal elements in eqns. 6 and 7 are the variances of the noise terms during their respective equations.

As discussed above, it is know that centroid measurements degrade with the amplitude of adjacent hotspots. Accordingly, an observation noise covariance matrix can be postulated having covariance terms that are inversely proportional to squared amplitude ($A^2$), according to:

$$V = \begin{bmatrix} \left(\frac{1}{A_s^2}\right) & 0 & 0 \\ 0 & \left(\frac{1}{A_1^2}\right) & 0 \\ 0 & 0 & \left(\frac{1}{A_2^2}\right) \end{bmatrix} \quad (8)$$

Eqn. 8 can be re-written in terms of the strongest amplitude. For example, if $A_1$ is the strongest amplitude, then Eqn. 8 can be re-written as:

$$V = \begin{bmatrix} \left(\frac{A_1^2}{A_s^2}\right) & 0 & 0 \\ 0 & 1 & 0 \\ 0 & 0 & \left(\frac{A_1^2}{A_2^2}\right) \end{bmatrix} \quad (9)$$

Eqn. 9 expresses the fact that the noise of an observation grows as its amplitude shrinks, i.e. as the observation worsens in quality. Formulating Eqn. 9 in this way allows the calculated Kalman filter to adapt to the amplitudes of the "spots" (i.e. the SOI and competing hotspot centroids), even when the amplitudes go to zero, meaning that the associated observation has infinite noise power.

The inverse matrix $V^{-1}$ can then be formulated as follows: if $A_s = \max(A_s, A_1, A_2)$, then:

$$V^{-1} = \begin{bmatrix} 1 & 0 & 0 \\ 0 & \left(\frac{A_1^2}{A_s^2}\right) & 0 \\ 0 & 0 & \left(\frac{A_2^2}{A_s^2}\right) \end{bmatrix} \quad (10)$$

if $A_1 = \max(A_s, A_1, A_2)$, then:

$$V^{-1} = \begin{bmatrix} \left(\frac{A_s^2}{A_1^2}\right) & 0 & 0 \\ 0 & 1 & 0 \\ 0 & 0 & \left(\frac{A_2^2}{A_1^2}\right) \end{bmatrix} \quad (11)$$

and if $A_2 = \max(A_s, A_1, A_2)$, then:

$$V^{-1} = \begin{bmatrix} \left(\frac{A_s^2}{A_2^2}\right) & 0 & 0 \\ 0 & \left(\frac{A_1^2}{A_2^2}\right) & 0 \\ 0 & 0 & 1 \end{bmatrix} \quad (12)$$

where each of the amplitudes $A_s$, $A_1$, $A_2$ is obtained from a sensor of the system, for example as a pixel output of an FPA or as the sum of the four pixel outputs of a quad-cell of the FPA.

Figure 6:
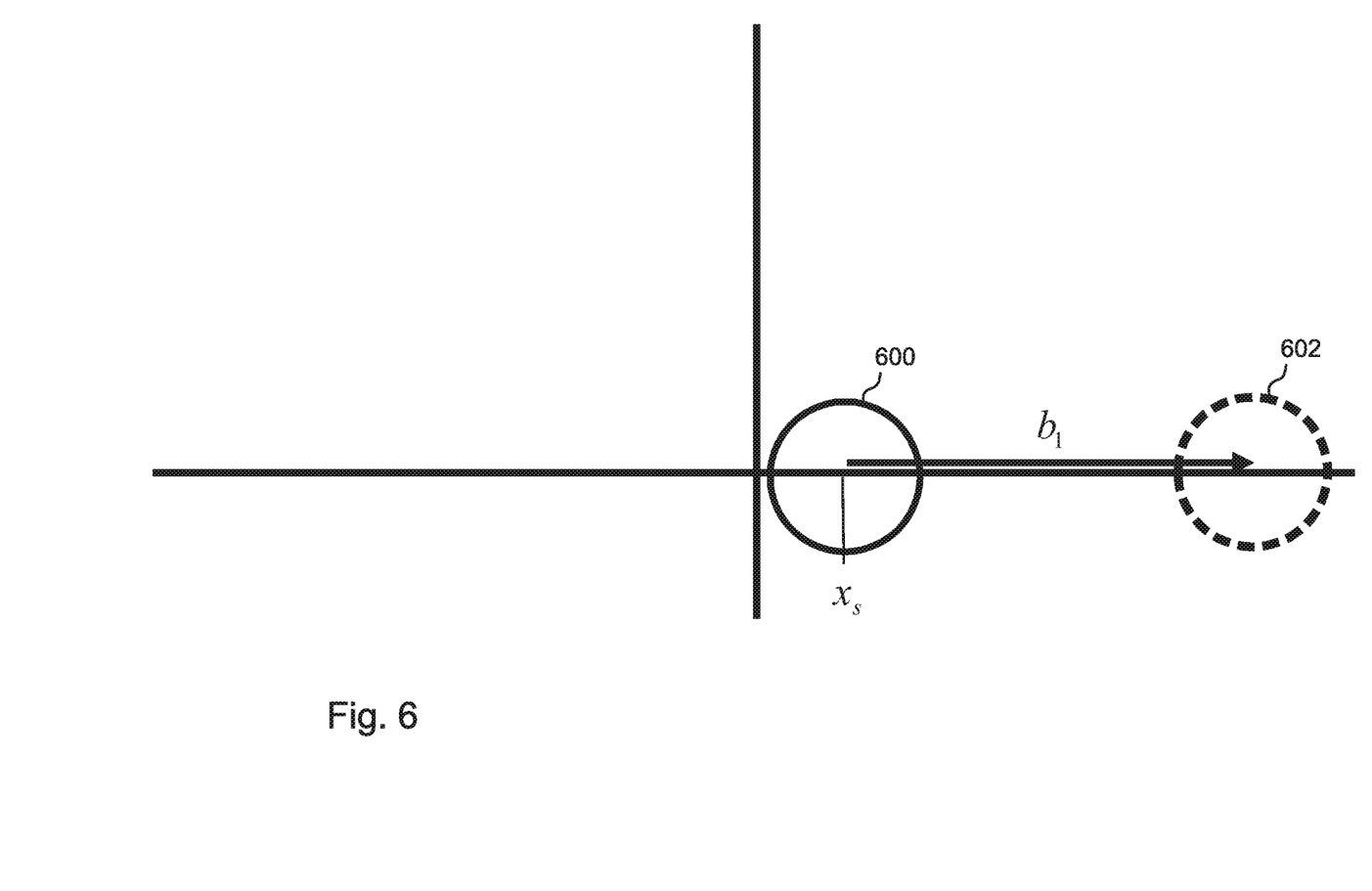
FIG. 6 illustrates relative positions of an SOI and a single competing hotspot.

With reference to FIG. 6, the equations for a 2-spot formulation, where only the SOI 600 and one competing hotspot 602 are present, are similar to the 3-spot formulation, but simplified. As before, the problem is to measure or estimate the centroid location of the SOI 600 by combining the centroid location data measured for each of the spots 600, 602 such that the accuracy of the SOI centroid estimate is better than a fraction of a pixel, even when the amplitude of the competing hotspot 602 is much greater than the amplitude of the SOI spot 600, and even when the intensity of the competing hotspot 602 can change in amplitude at any time, and can even come and go. The second order Kalman filter equations for this two-spot case are as follows:

$$P = \begin{bmatrix} p_{11} & p_{12} \\ p_{21} & p_{22} \end{bmatrix} \quad (13)$$

$$X = \begin{bmatrix} x_s \\ x_1 \end{bmatrix} \quad (14)$$

$$P = W - PC'V^{-1}CP \quad (15)$$

$$\hat{x} = K(y - C\hat{x}) \quad (16)$$

$$K = PC'V^{-1} \quad (17)$$

$$P(0) = \begin{bmatrix} 0 & 0 \\ 0 & 0 \end{bmatrix} \quad (18)$$

$$\hat{x}(0) = \{0, 0\} \quad (19)$$

$$C = \begin{bmatrix} 1 & 0 \\ 1 & 1 \end{bmatrix} \quad (20)$$

-continued $$W = \begin{bmatrix} 100 & 0 \\ 0 & 100 \end{bmatrix} \quad (21)$$

$$V^{-1} = 500 \begin{bmatrix} 1 & 0 \\ 0 & \frac{A_1^2}{A_s^2} \end{bmatrix} \text{ if } A_s \text{ max} \quad (22)$$

$$V^{-1} = 500 \begin{bmatrix} \frac{A_s^2}{A_1^2} & 0 \\ 0 & 1 \end{bmatrix} \text{ if } A_1 \text{ max} \quad (23)$$

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A method of identifying and tracking a laser communication signal of interest, the method comprising:
    directing incident light from a scene onto a focal plane array (FPA); designating a plurality of light intensity maxima detected by the FPA as hotspots belonging to a group of hotspots;
    identifying one of the hotspots in the group of hotspots as the laser communication signal of interest (SOI), and designating the other hotspots in the group of hotspots as competing hotspots;
    adjusting an incident direction of the incident light from the scene so as to align the laser communication SOI with a laser data receiver;
    measuring location and amplitude data for each of the hotspots in the group of hotspots;
    performing a multi-spot estimation of a centroid of the laser communication SOI under an assumption that relative locations of all of the hotspots in the group of hotspots are constant, said multi-spot estimation comprising applying a Kalman filter to the location data measured for the hotspots, the location data for each of said hotspots being weighted according to a magnitude of the amplitude data measured for said hotspot, so that the result of the multi-spot estimation is more strongly influenced by hotspots for which the measured amplitude data is stronger, and less strongly influenced by hotspots for which the measured amplitude data is weaker; and adjusting the incident direction of the light from the scene as needed to maintain alignment of the laser communication SOI with the laser data receiver.

2. The method of claim 1, wherein aligning the laser communication SOI with the laser data receiver includes positioning the laser communication SOI at a tracking location on the FPA.

3. The method of claim 1, wherein designating the plurality of light intensity maxima detected by the FPA as hotspots includes considering pixels of the FPA in a sliding window that defines square pixel groups of six by six pixels, and designating pixels within the pixel groups having output amplitudes that are local maxima as hotspots.

4. The method of claim 1, wherein for each of the hotspots, measuring the location information for the hotspot comprises:
  identifying a quad-cell of the FPA within which the hotspot is located, the quad-cell being a group of four adjacent pixels of the FPA arranged in a square; and
  estimating a centroid of the hotspot according to relative output amplitudes of the four pixels of the quad-cell.

5. The method of claim 1, wherein the laser communication SOI comprises a signal component and a beacon component that differ from each other in wavelength, said components being overlapping and parallel.

6. The method of claim 5, further comprising separating beacon light having the beacon component wavelength from the incident light, and directing only the beacon light onto the FPA.

7. The method of claim 1, wherein the multi-spot estimation of the centroid of the laser communication SOI has an estimation error that is less than a smallest dimension of each of the pixels of the FPA.

8. The method of claim 1, further comprising repeating the step of designating the plurality of light intensity maxima as hotspots, whereby newly appearing hotspots are added to the group of hotspots and previously designated hotspots that are not detected are deleted from the group of hotspots.

9. An apparatus for tracking a laser communication signal of interest, the apparatus comprising:
  a beam-directing device configured to direct incident light from a scene onto a focal plane array (FPA);
  a hotspot identifier configured to receive light intensity data from the FPA, to designate a plurality of maxima of the FPA light intensity data as hotspots belonging to a group of hotspots, and to determine amplitude and location information pertaining to the hotspots;
  a signal identifier configured to identify one of the hotspots as the laser communication signal of interest (SOI);
  a laser data receiver; and
  a controller configured to accept data pertaining to the incident light from the FPA, hotspot identifier, and signal identifier, the controller being further configured to:
    estimate a location of a centroid of the laser communication SOI;
    according to the estimated location of the SOI centroid, cause the beam-directing device to adjust an incident direction of the incident light from the scene so as to align the laser communication SOI with the laser data receiver;
    perform a multi-spot estimation of the centroid location of the laser communication SOI under an assumption that relative locations of all of the hotspots in the group of hotspots are constant, said multi-spot calculation comprising applying a Kalman filter to the location data pertaining to the hotspots, the location data for each of said hotspots being weighted according to a magnitude of the amplitude data pertaining to said hotspot, so that the result of the multi-spot calculation is more strongly influenced by hotspots having stronger amplitude data, and less strongly influenced by hotspots having weaker amplitude data; and
    cause the beam-directing device to adjust the incident direction of the light from the scene as needed to maintain alignment of the laser communication SOI with the laser data receiver, so that the laser data receiver is able to receive wireless data from the laser communication signal of interest.

10. The apparatus of claim 9, further comprising a beam dividing device configured to separate overlapping and parallel laser beam components of differing wavelengths included in the laser communication SOI, one of said components being a beacon component.

11. The apparatus of claim 10, wherein the beam dividing device comprises at least one of a diffraction grating, a prism, a beam splitter, and a bandpass filter.

12. The apparatus of claim 10, wherein the beam dividing device is configured to direct the beacon component onto the FPA, while directing at least one other of the components onto the laser data receiver.

13. The apparatus of claim 12, wherein the controller is configured to align the laser communication SOI with the laser data receiver by aligning the beacon component of the laser communication SOI with a tracking location of the FPA.

14. The apparatus of claim 9, wherein the hotspot identifies is configured to determine the location information pertaining to each of the hotspots by:
  identifying a quad-cell of the FPA within which the hotspot is located, the quad-cell being a group of four adjacent pixels of the FPA arranged in a square; and
  estimating a centroid of the hotspot according to relative output amplitudes of the four pixels of the quad-cell.

15. The apparatus of claim 9, wherein the controller is configured to perform the multi-spot estimation with an error that is less than a smallest dimension of each of the pixels of the FPA.

16. The apparatus of claim 9, wherein the hotspot identifier is further configured to periodically update the group of hotspots, whereby newly appearing hotspots are added to the group of hotspots and previously designated hotspots that are no longer detected are deleted from the group of hotspots.

* * * * *